United States Patent [19]

Kumabe

[11] 4,054,076
[45] Oct. 18, 1977

[54] ROLLING CUT TYPE SHEAR

[75] Inventor: Satoru Kumabe, Yokohama, Japan

[73] Assignee: Ishikawajima-Harima Jukogyo Kabushiki Kaisha, Tokyo, Japan

[21] Appl. No.: 748,563

[22] Filed: Dec. 8, 1976

[30] Foreign Application Priority Data

Feb. 10, 1976   Japan .................................. 51-13527

[51] Int. Cl.² ............................................. B23D 15/08
[52] U.S. Cl. ........................................ 83/644; 83/646
[58] Field of Search ..................... 83/644, 646, 647.5

[56] References Cited

U.S. PATENT DOCUMENTS 2,130,818   9/1938   Soderberg ......................... 83/646 X Primary Examiner—J. M. Meister
Attorney, Agent, or Firm—Scrivener, Parker, Scrivener & Clarke

[57] ABSTRACT

Disclosed is a rolling cut type shear wherein a downwardly curved upper blade is moved in such a way that the midpoint thereof in the longitudinal direction passes a cycloidal path, whereby the slip of the upper blade relative to a steel plate to be cut may be prevented.

1 Claim, 7 Drawing Figures

ROLLING CUT TYPE SHEAR

DETAILED DESCRIPTION OF THE INVENTION

In the rolling cut type shears, the slip of the upper blade relative to a steel plate to be cut results in damages to the surface of the steel plate and relative rapid wear of the cutting edge. Therefore the upper blade must roll without slipping relative to a steel plate to be cut.

In FIG. 1 there is shown one example of the conventional rolling cut type shears. An upper blade holder $b$ with an upper blade $c$ attached to the lower edge thereof is pivoted to the lower ends of connecting rods $a$ and $a'$ connected to crankshafts (not shown) and to the piston rod of a hydraulic cylinder $e$ pivotably mounted on a shear frame $d$. The upper blade holder $b$ is pulled by the hydraulic cylinder $e$ and then lowered along the cam surface of the cam plate $f$ attached to the shear frame $d$ with a roller $g$ interposed between the upper blade holder $b$ and the cam plate $f$ so that the slip of the upper blade $c$ relative to a steel plate to be cut may be prevented.

In FIG. 2 there is shown another example of the conventional rolling cut type shears. A slide $h$ is attached to the upper blade $c$ at the midpoint of the longitudinal length thereof for slidable movement in a guide groove $i$ attached to the shear frame so that the slip of the upper blade relative to the steel plate to be cut may be prevented.

However, the shear of the type shown in FIG. 1 has some problems. Firstly, it consists of a relatively large number of parts such as the hydraulic cylinder $e$, the cam plate $f$ and the roller $g$. Especially the provision of the hydraulic circuits results in the increase in cost. Secondly, it is difficult to design the suitable cam profile of the cam plate $f$, and the machining of the cam plate is not easy. Thirdly, the cam plate $f$ and the roller $g$ wear easily. The shear of the type shown in FIG. 2 has also some problems to be described below. Firstly, the lubricant which is applied to the slide $h$ and the guide groove $i$ leaves stains or the like on the surface of steel plates. Secondly, the slide and guide, wear easily. Thirdly the guide mechanism cannot be employed in some shears of the type in which the cut steel plate must pass through under the upper blade holder because the guide which extends downward beyond the cutting edge of the upper blade interfers with the steel plate.

The present invention was made to overcome the above and other problems encountered in the conventional rolling cut type shears, and will become apparent from the following description of a preferred embodiment thereof taken in conjunction with the accompanying drawings, in which.

Figure 1:
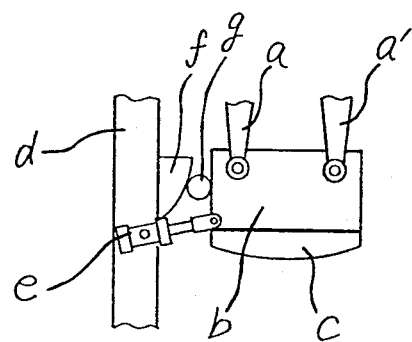
FIGS. 1 and 2 are schematic fragmentary views of conventional rolling cut type shears, respectively.
Figure 2:
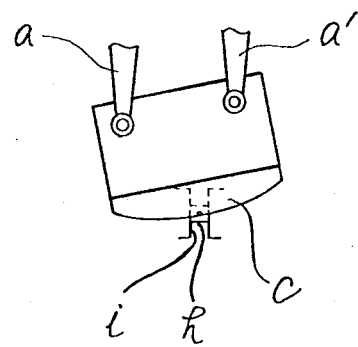
Figure 3:
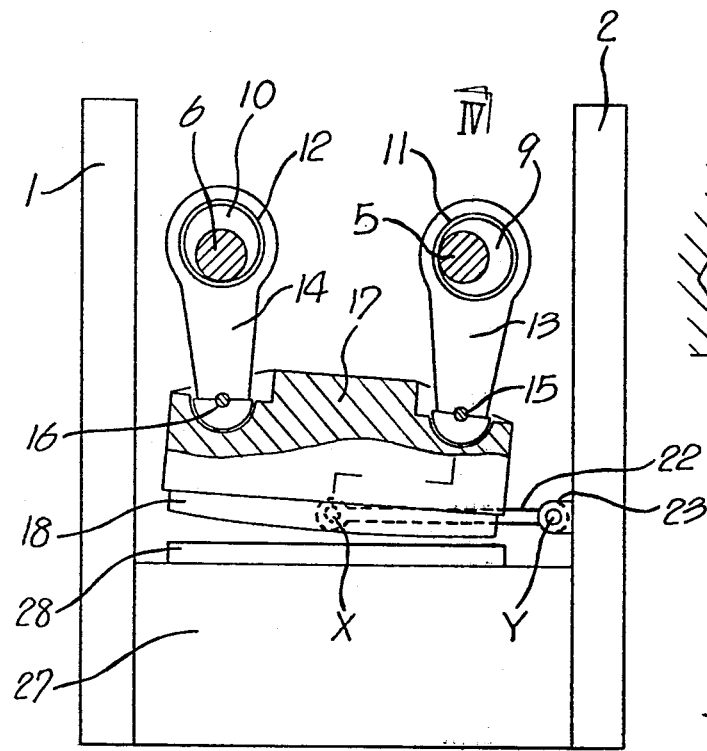
FIG. 3 is a schematic front view of a rolling cut type shear in accordance with the present invention.
Figure 4:
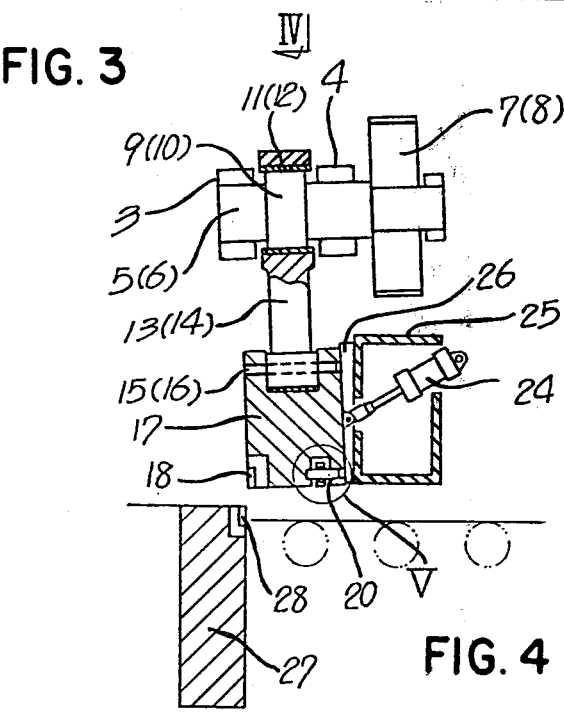
FIG. 4 is a sectional view thereof taken along the line IV—IV of FIG. 3.

First referring to FIGS. 3 and 4, two crankshafts 5 and 6 each formed with an eccentric 9 or 10 are supported by bearings 3 and 4 which in turn are attached to shear frames 1 and 2. A gear 7 or 8 carried by the crankshaft 5 or 6 is drivingly coupled to a prime mover (not shown). A connecting rod 13 or 14 is fitted over the eccentric 9 or 10 with a bush 11 or 12 interposed therebetween, and an upper blade holder 17 is pivoted with pins 15 and 16 to the lower ends of the connecting rods 13 and 14.

Figure 5:
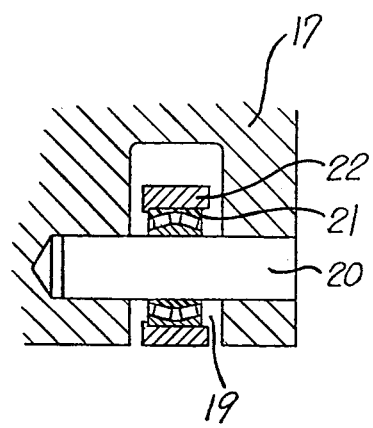
FIG. 5 is a detailed view, on enlarged scale, of an encircled portion V in FIG. 4.

A downwardly curved upper blade 18 is attached to one side surface of the upper blade holder 17, and a groove 19 (See FIG. 5) is formed in the bottom of the upper blade holder 17 close to the other side surface thereof and in parallel with the upper blade 18. A pin 20 is fitted into the upper blade holder 17 and extended across the groove 19 at the position corresponding to the midpoint X of the longitudinal length of the upper blade 18, and one end of a connecting rod 22 is pivoted to the pin 20 with a spherical bearing 21 interposed therebetween (See FIG. 5) while the other end of the connecting rod 22 is pivoted with a pin Y to a bracket 23 attached to the shear frame 2, which is the starting side of the cutting work. In order to limit the slip of the upper blade 18 to the minimum, it is preferable to select the midpoint X as close as practicable to the cutting edge of the upper blade 18 within a range in which the interference of the midpoint X with the steel plate may be avoided.

A hydraulic cylinder 24 is pivoted to a frame 25 and has its piston rod pivoted to the other side surface of the upper blade holder 17. Wedges 26 are interposed between the upper blade holder 17 and the frame 25 so that the holder 17 is pulled by the hydraulic cylinder 24 to slide in close contact with the wedges 26.

A lower blade 28 is attached to a stand 27 as best shown in FIG. 4.

Next the mode of operation will be described. The prime mover such as a motor (not shown) drives the crankshafts 5 and 6 through the gears 7 and 8. The eccentrics 9 and 10 of the crankshafts 5 and 6 are so angularly spaced apart that the connecting rods 13 and 14 swing in such a way that the upper blade 18 rolls relative to the lower blade 28 in the longitudinal direction of the upper blade 18.

Figure 6:
FIG. 6 shows a part of a cycloid used for the explanation of the present invention.
Figure 7:
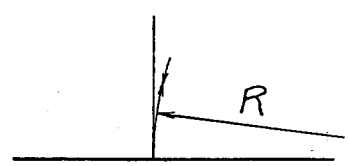
FIG. 7 shows the locus of an upper blade.

Since the cutting edge of the upper blade is curved downwardly, when the upper blade 18 rolls without any slip relative to a steel plate to be cut, the midpoint X draws a cycloid C as shown in FIG. 6. However, according to the present invention, the upper blade 18 is connected with the connecting rod 22 to the frame 2 so that the midpoint X vertically reciprocates along an arc of a circle with the center at Y and the radius R equal to the length of the connecting rod 22 as shown in FIG. 7. The midpoint X passes the same path in going down and up. In the latter half of the upward stroke, the path of the midpoint X deviates from the cycloid C, but this deviation presents no problem in shearing because shearing is substantially completed in the downward stroke and because the upper blade 18 moves away from the surface of the steel plate in the latter half of the upward stroke. Thus the steel plates may be completely cut without any adverse effects by the rolling swinging motion of the upper blade 18.

It will be understood that the present invention is not limited to the preferred embodiment described above and that various modifications may be effected without leaving the true spirit of the present invention. For instance, the present invention may be applied to any rolling cut type shears.

The features and advantages of the present invention may be summarized as follows:

i. The construction is very simple so that the capital cost may be considerably reduced;

ii. No cam plate, no roller and no guide groove; that is, no sliding part is included so that the inspection and maintenance may be much facilitated;

iii. Since no guide groove is provided, the contamination of steel plates with lubricant may be avoided;

iv. The construction ensures sufficient resistance of the upper blade to the force acting in the longitudinal direction thereof, and there is no play at all so that shearing with a higher order of accuracy may be accomplished.

What is claimed is:

1. A rolling cut type shear wherein a lower blade is securely attached to a stand and a downwardly curved upper blade is attached to an upper blade holder which swings upon rotation of crankshafts, and the point on the upper blade holder which corresponds substantially to the midpoint of the upper blade in the longitudinal direction thereof and a shear frame which is the starting side of the cutting work are interconnected with a connecting rod which extends substantially in parallel with the lower blade through spherical bearings.

* * * * *